United States Patent
Bansal et al.

(10) Patent No.: US 9,581,807 B2
(45) Date of Patent: Feb. 28, 2017

(54) SUPPLY INDEPENDENT AND PROGRAMMABLE NON-RESONANT MEMS DRIVER

(71) Applicants: AGENCY FOR SCIENCE, TECHNOLOGY AND RESEARCH, Singapore (SG); MARADIN LTD., South Yokneam (IL)

(72) Inventors: Amit Bansal, Singapore (SG); Ravinder Pal Singh, Singapore (SG); Meng Tong Tan, Singapore (SG); Minkyu Je, Singapore (SG); Tal Langer, South Yokneam (IL)

(73) Assignees: Agency for Science, Technology and Research, Singapore (SG); Maradin Ltd., Yokneam Industrial Park South (IL)

( * ) Notice: Subject to any disclaimer, the term of this patent is extended or adjusted under 35 U.S.C. 154(b) by 14 days.

(21) Appl. No.: 14/616,622

(22) Filed: Feb. 6, 2015

(65) Prior Publication Data
US 2015/0219875 A1   Aug. 6, 2015

(30) Foreign Application Priority Data
Feb. 6, 2014   (SG) ................................ 201400910.4

(51) Int. Cl.
*G02B 26/08* (2006.01)
(52) U.S. Cl.
CPC ................................ *G02B 26/0841* (2013.01)

(58) Field of Classification Search
CPC   G02B 26/0841; G02B 26/105; G02B 26/085; G02B 26/0858; G02B 26/0833; G02B 26/101; B81B 3/0083; B81B 3/0086; B81B 2203/04
See application file for complete search history.

(56) References Cited

U.S. PATENT DOCUMENTS 7,597,819 B1 * 10/2009 Hankins .............. B81C 1/00476
                                                                                           216/102
2010/0271144 A1 * 10/2010 McCorquodale ........ H03B 5/04
                                                                                         331/117 FE

* cited by examiner

*Primary Examiner* — Jennifer L. Doak
(74) *Attorney, Agent, or Firm* — Blakely, Sokoloff, Taylor & Zafman LLP

(57) ABSTRACT

A motor driver circuit for a Micro-electro-mechanical systems (MEMS) micro-mirror device, the motor driver circuit comprising: a non-inverting buffer circuit; an inverting buffer circuit; and a scalar circuit, the scalar circuit comprising a Supply Tracked Common Mode Voltage (VCMSC) generation circuit, wherein the non-inverting buffer circuit, the inverting buffer circuit, and the scalar circuit are configured, together with the VCMSC generation circuit, to provide a common mode voltage to a motor in response to a VCMSC voltage generated by the VCMSC generation circuit, and wherein the VCMSC voltage is generated by the VCMSC generation circuit in response to a control supply voltage and a driver supply voltage provided to the VCMSC generation circuit.

10 Claims, 14 Drawing Sheets

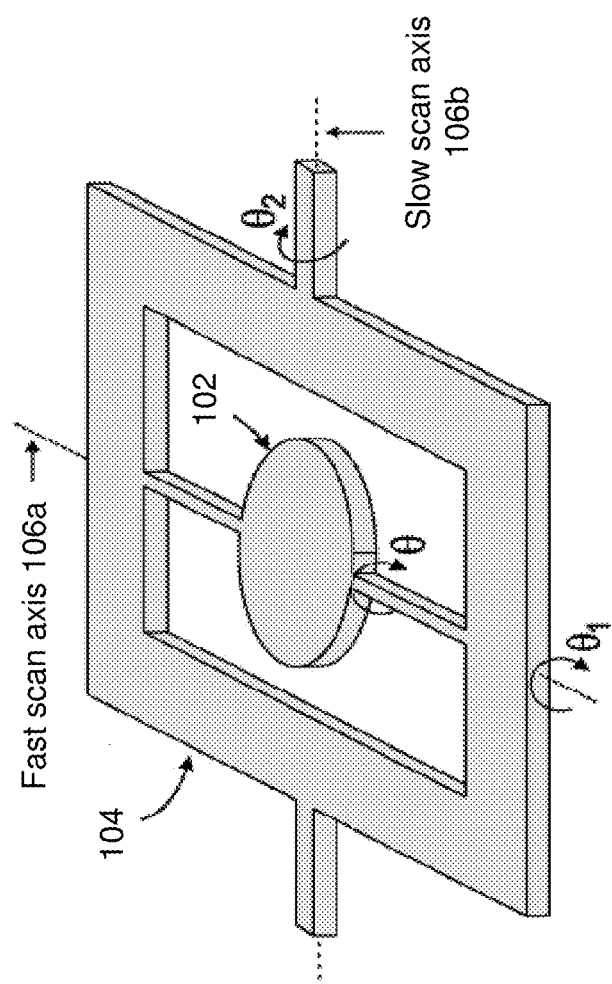

250

200

300

450

400

550

500

600

700

800

1000

1100

1200

1300

1400

SUPPLY INDEPENDENT AND PROGRAMMABLE NON-RESONANT MEMS DRIVER

PRIORITY CLAIM

The present application claims priority to Singapore Patent Application No. 201400910-4.

FIELD OF THE INVENTION

The present invention relates to the field of micro-electro-mechanical system (MEMS) devices. In particular, it relates to MEMS micro-mirror drivers.

BACKGROUND

In recent years, micro-electro-mechanical system (MEMS) devices have been used to create compact scanning beam imaging systems. MEMS based scanning beam systems have been used extensively in various applications such as head-mounted see through displays, barcode scanners, endoscopes, and in portable projectors. Typically, two dimensional (2D) MEMS scanning beam systems (MEMS scanners) use a single mirror suspended in a gimbaled frame. These scanning mirrors are actuated by electrostatic or electromagnetic forces to reflect incident light beam from a laser source in order to project 2D image patterns onto a surface.

There are several drawbacks to conventional circuit architectures for driving MEMS scanning mirrors. Typically, currents with sinusoidal waveforms are employed to actuate (i.e. drive) MEMS scanning mirrors. However, this approach is not optimal as MEMS scanning mirrors driven by currents having sinusoidal waveforms suffer from discontinuities (i.e. dead zones) when the MEMS scanning mirrors are at resonance. This is undesirable as dead zones prevent data from being encoded onto, or decoded from, the projected beam. Further, MEMS scanning mirrors are highly reliant on a stable supply voltage in order to function optimally. If the supply voltage (from a battery cell for example) varies over time, the device would need to be recalibrated frequently. This translates to additional costs and operational inefficiency of conventional MEMS scanners.

Accordingly, what is needed is a robust and efficient means to actuate MEMS scanning mirrors. Furthermore, other desirable features and characteristics will become apparent from the subsequent detailed description and the appended claims, taken in conjunction with the accompanying drawings and this background of the disclosure.

SUMMARY

In a first aspect of the present invention, a motor driver circuit for a Micro-electro-mechanical systems (MEMS) micro-mirror device is disclosed. The motor driver circuit comprises a non-inverting buffer circuit, an inverting buffer circuit, and a scalar circuit. The scalar circuit comprises a Supply Tracked Common Mode Voltage (VCMSC) generation circuit, wherein the non-inverting buffer circuit, the inverting buffer circuit, and the scalar circuit are configured, together with the VCMSC generation circuit, to provide a common mode voltage to a motor in response to a VCMSC voltage generated by the VCMSC generation circuit, and wherein the VCMSC voltage is generated by the VCMSC generation circuit in response to a control supply voltage and a driver supply voltage provided to the VCMSC generation circuit.

In a second aspect of the present invention, a MEMS device is disclosed. The MEMS device comprises a MEMS micro-mirror, a motor coupled to a MEMS micro-mirror, and a motor driver circuit. The motor driver circuit comprises a non-inverting buffer circuit, an inverting buffer circuit, and a scalar circuit. The scalar circuit comprises a VCMSC generation circuit, wherein the non-inverting buffer circuit, the inverting buffer circuit, and the scalar circuit are configured, together with the VCMSC generation circuit, to provide a common mode voltage to a motor in response to a VCMSC voltage generated by the VCMSC generation circuit, and wherein the VCMSC voltage is generated by the VCMSC generation circuit in response to a control supply voltage and a driver supply voltage provided to the VCMSC generation circuit.

In a third aspect of the present invention, a method of controlling a MEMS micro-mirror is disclosed. The method comprises coupling a non-inverting buffer circuit, an inverting buffer circuit, and a scalar circuit to a motor driving a MEMS micro-mirror, the scalar circuit comprising a VCMSC generation circuit, and configuring the non-inverting buffer circuit, the inverting buffer circuit, and the scalar circuit, together with the VCMSC generation circuit, to provide a common voltage to a motor in response to a VCMSC voltage generated by the VCMSC generation circuit, wherein the VCMSC voltage is generated by the VCMSC generation circuit in response to a control supply voltage and a driver supply voltage provided to the VCMSC generation circuit.

BRIEF DESCRIPTION OF DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIG. 1 illustrates a top side perspective drawing of a conventional Micro-electro-mechanical systems (MEMS) scanning mirror suspended on a gimballed frame.

FIG. 2, comprising FIG. 2A and FIG. 2B, illustrates a conventional circuit architecture for a MEMS scanning mirror, wherein FIG. 2A illustrates a top side perspective drawing of the physical structure and FIG. 2B illustrates a corresponding circuit diagram.

FIG. 4, comprising FIG. 4A and FIG. 4B, illustrates wave forms generated by a conventional MEMS scanning device, wherein FIG. 4A illustrates a saw tooth stepped wave form for vertical scanning and FIG. 4B illustrates the corresponding position reference voltage, control voltage to motor driver, and motor current.

FIG. 5, comprising FIG. 5A and FIG. 5B, illustrates a conventional means for actuating a MEMS scanning mirror, wherein FIG. 5A illustrates a H-bridge motor drive circuit and FIG. 5B illustrates the corresponding dead zone generated by the circuit.

FIG. 9A and FIG. 9B, illustrates Supply Tracked Common Mode Voltage (VCMSC) generation in the present embodiment, wherein FIG. 9A illustrates circuit architecture of the scalar circuit comprising a VCMSC generation circuit and FIG. 9B illustrates circuit architecture of the VCMSC generation circuit.

Figure 2B:
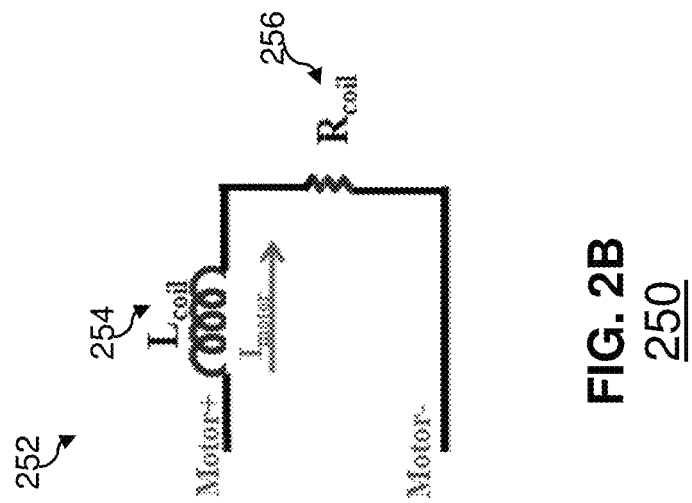

Skilled artisans will appreciate that elements in the figures are illustrated for simplicity and clarity and have not necessarily been depicted to scale. For example, the dimensions of some of the elements in the block diagrams or flowcharts may be exaggerated in respect to other elements to help to improve understanding of the present embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the present embodiment to present an improved means for actuating Microelectro-mechanical systems (MEMS) scanning mirrors.

FIG. 1 illustrates a top side perspective drawing 100 of a conventional MEMS scanning mirror 102 suspended on a gimballed frame 104. Typically, two dimensional (2D) MEMS scanners use a single mirror 102 suspended in a gimbaled frame 104 where it is allowed to rotate freely around its two axes of motion 106a 106b. 2D scanners conventionally include an inner plate carrying a mirror 102 that undergoes a fast horizontal scan across the field of view (FOV) in the fast scan axis 106a, and an outer gimbaled ring 104 performing a slower scan in the slow scan axis 106b at the video frame rate. Two common technologies are electrostatic and electromagnetic driving.

Figure 2A:
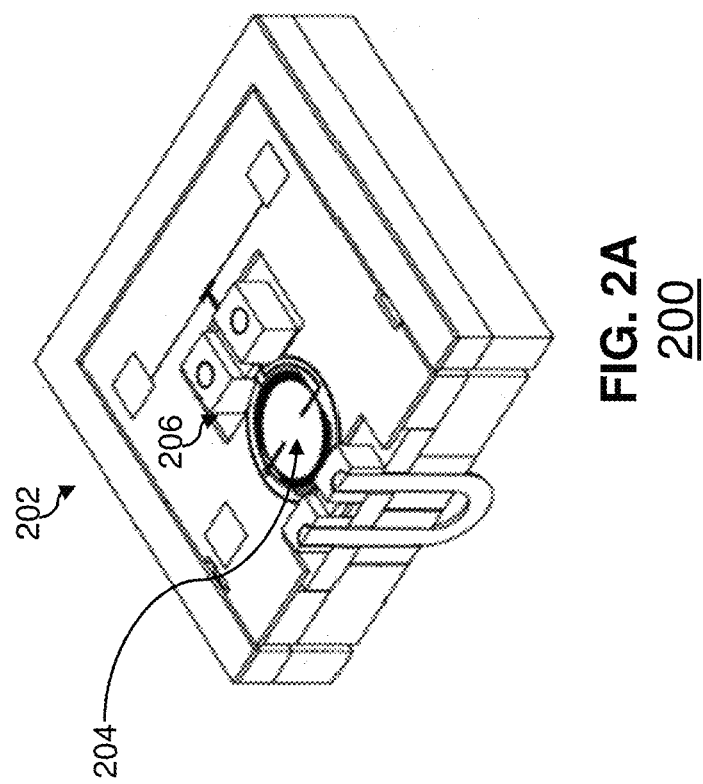

FIG. 2, comprising FIG. 2A and FIG. 2B, illustrates a conventional circuit architecture for a MEMS scanning mirror, wherein FIG. 2A illustrates a top side perspective drawing 200 of the physical architecture of the MEMS scanning device 202 and FIG. 2B illustrates a corresponding circuit diagram 252. For the electromagnetic driving, the MEMS mirror 204 is suspended in a gimbaled frame containing field coils (not shown). Permanent magnets 206 are assembled around the MEMS die to induce a magnetic field. Applying electrical current to the field coils generates a magnetic torque on the mirror 204. The magnetic torque enables the mirror 204 to rotate around its axis. FIG. 2B illustrates the corresponding circuit diagram 250 of the MEMS scanning device 202, 252. In FIG. 2B, the circuit of the MEMS scanning device 202, 252 is represented as combination of an inductor 254 and a resistor 256 in series. In conventional circuits, the inductance value varies from 5 uH to 100 uH and the resistance value varies from 1 ohm to 20 ohms.

Figure 3:
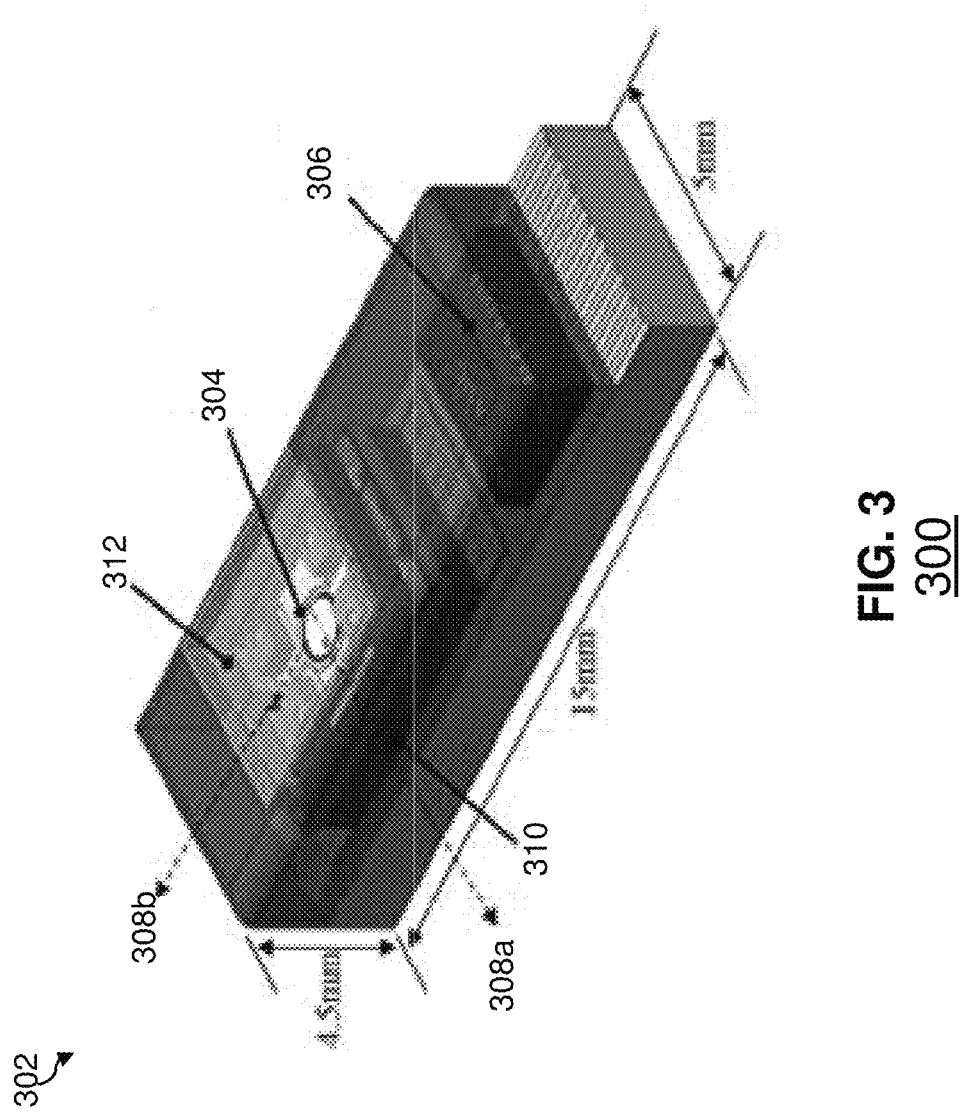
FIG. 3 illustrates a top side perspective drawing of a conventional MEMS scanner integrated with a driving Application Specific Integrated Circuit (ASIC).

FIG. 3 illustrates a top side perspective drawing 300 of a conventional MEMS scanner 302 with a MEMS scanning mirror 304 integrated with a driving Application Specific Integrated Circuit (ASIC) 306. The MEMS scanning mirror 304 has two axis of rotation 308a 308b. The electromagnetic actuator 310 and optical window 312 are also depicted in FIG. 3.

During vertical scanning, the mirror 304 rotates around its rest position up to certain angles in both positive and negative directions. Motion of the mirror 304 is controlled by the voltages generated by the driving ASIC 306. Voltage waveforms may be of different types, including, interleaved saw tooth scanning, triangular wave scanning, and sinusoidal scanning, for example.

Figure 4B:
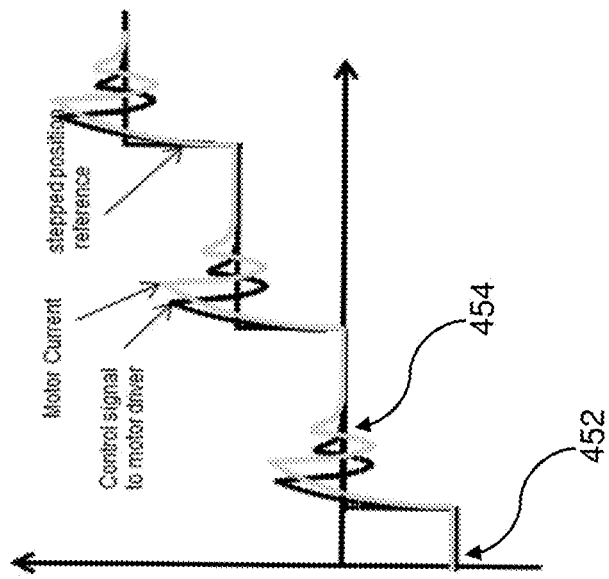
Figure 4A:
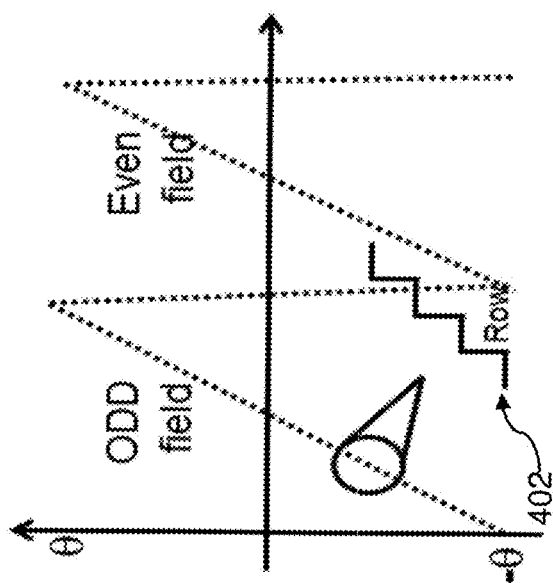

FIG. 4, comprising FIG. 4A and FIG. 4B, illustrates wave forms generated by a conventional MEMS scanning device, wherein FIG. 4A illustrates a plot 400 of a saw tooth stepped wave form for vertical scanning and FIG. 4B illustrates the corresponding plot 450 of the position reference voltage, control voltage to motor driver, and motor current when the mirror is switching from one row to another. In this example, the control voltage to the motor driver 452 is held constant during the time the mirror is scanning a row horizontally 402. For a best quality image projection, the mirrors oscillations are required to settle down from one row to its next row within the minimum time 454. Conventionally, the settling time 454 is allowed to be 10% of the time it stays scanning a full row. The stringent requirement on the settling time 454 can be achieved by providing higher motor currents during the switching transient. The control voltage and motor current transients when mirror is switching from one row to another can be seen in FIG. 4B.

Scanning mirrors at resonance are driven by the sinusoid waveforms and the mirror scans fully around its rest position with peak deflection of the mirror at resonance. For scanning using stepped saw tooth waveform (shown in FIG. 4A), mirror position is decided by the Direct Current (DC) voltage generated by the control circuit. The control circuit works at a lower supply voltage to reduce the power consumption, while the driver operates at higher supply voltage for increased drivability. A scalar circuit (i.e. scalar) is required when boosting the lower voltage control signals to a higher voltage signals to drive the MEMS scanning mirror. The scalar circuit also serves the purpose of adjusting the size of the image projection by controlling the amount of current flowing though the scanning mirror.

Appropriate gain for the scalar (i.e. scalar gain) is designed based on supply voltages ratio. Common-mode voltage for the scalar has to be generated such that the rest position of the mirror always corresponds to the common-mode of the driving signal. The common-mode of driving signal is usually half of the supply voltage for the control circuit. If there are variations in the supply voltages (which is possible for a battery powered driver circuit), both the scalar gain and common-mode voltage have to be redesigned or recalibrated. The common mode voltage for the scalar has to be designed such that scalar works independent of supply variations.

Figure 5B:
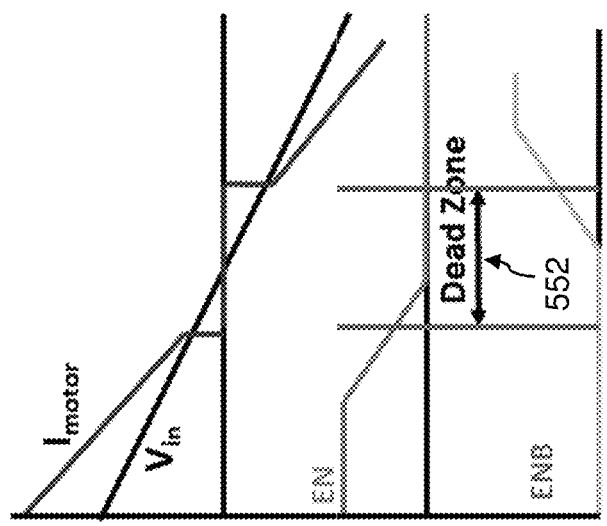
Figure 5A:
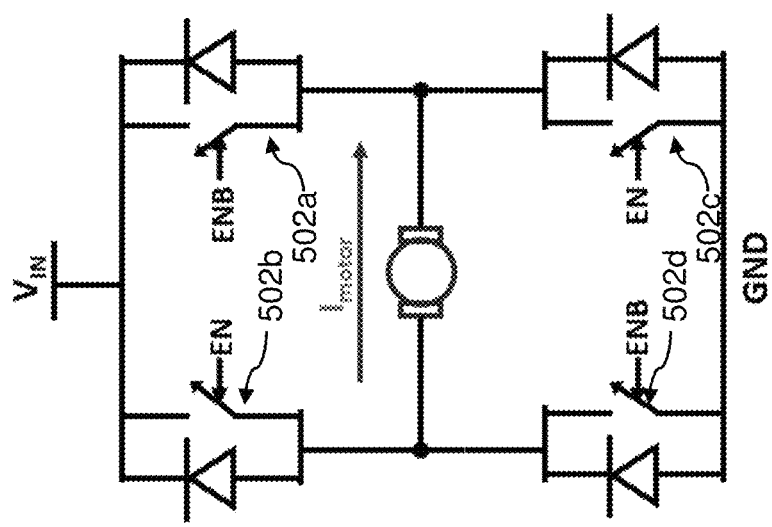

Conventionally, motors are driven using H-bridge circuit topology shown in FIG. 5A. H-bridge circuits 500 use four switches 502a, 502b, 502c, 502d and a switch driver circuit (not shown). The switch driver circuit ensures that the switches for one current flow direction 502a, 502d are turned off before turning on the other direction switches 502b, 502c. This method is called break before make (BBM) technique. BBM is required to prevent the short circuit when the current direction is switched. Without BBM all the switches will be on for some time hence the input current is directly shorted to ground, resulting in a fault.

For the safe operation of the motor driver circuit a dead zone 552 is introduced around the current direction switching instant. In the dead zone 552, all the switches of H-bridges are tuned off when current direction is switched, resulting in zero current through the motor, as illustrated in the plot 550 in FIG. 5B. On one hand dead-zone 552 is essential for removing the faults and on the other hand it stops the motor motion for some time. There will not be any deflection of the MEMS mirror in the dead-zone 552 resulting in compromised quality of the image. Such dead-zone 552 cannot be used while driving the mirror in saw-tooth or stepped manner.

Figure 6:
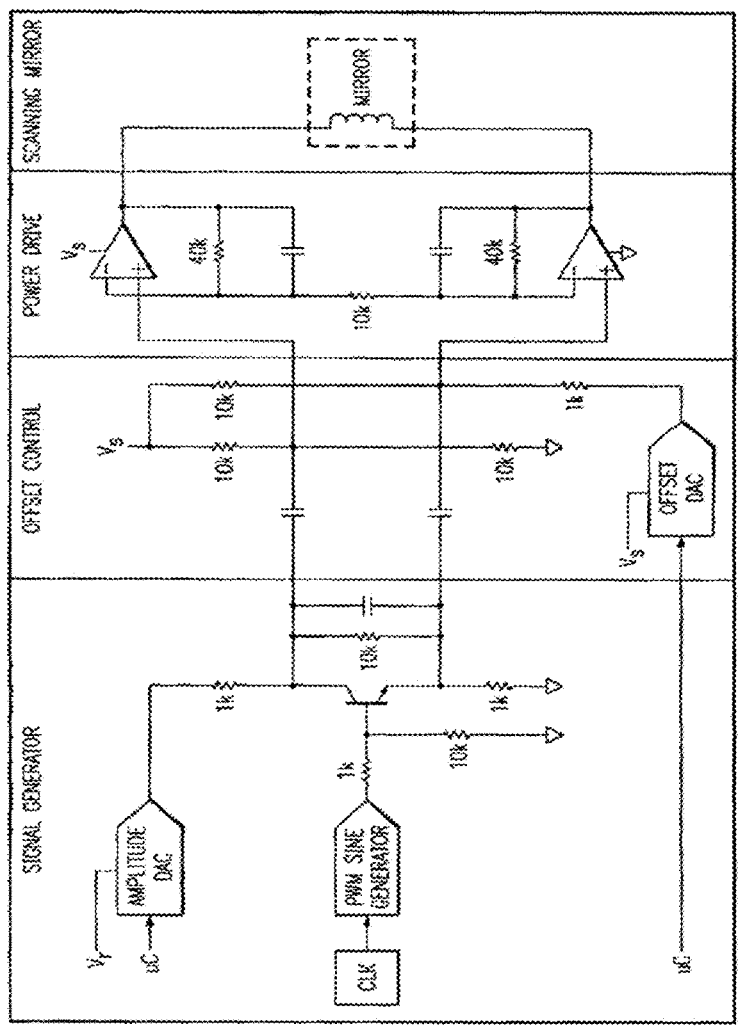
FIG. 6 illustrates a circuit diagram of a conventional MEMS resonant scanning mirror driver configuration.

Algorithms have been proposed to remove the dead zone 552, but they require additional hardware and also involve real time measurement of the motor motion parameters, which is difficult to achieve. Conventional resonant scanning mirrors drivers attempt to address this problem though circuit design and configuration. A diagram 600 of a conventional resonant scanning mirror driver is shown in FIG. 6. The driver utilizes pulse width modulation (PWM) patterns using predetermined algorithms to achieve desired deflection of the mirror. However, this is not applicable for a non-resonant driving, as is the case with saw-tooth or stepped mirror movement.

Accordingly, an ideal motor driver should 1) be able to provide bidirectional current to the motor with high current drivability, 2) have linear motor current versus control voltage characteristics without any discontinuities or dead zones, 3) be able to adjust the size of the image projection by programming the current to the motor, and 4) have the supply tracked common-mode generation for voltage translation.

Figure 7:
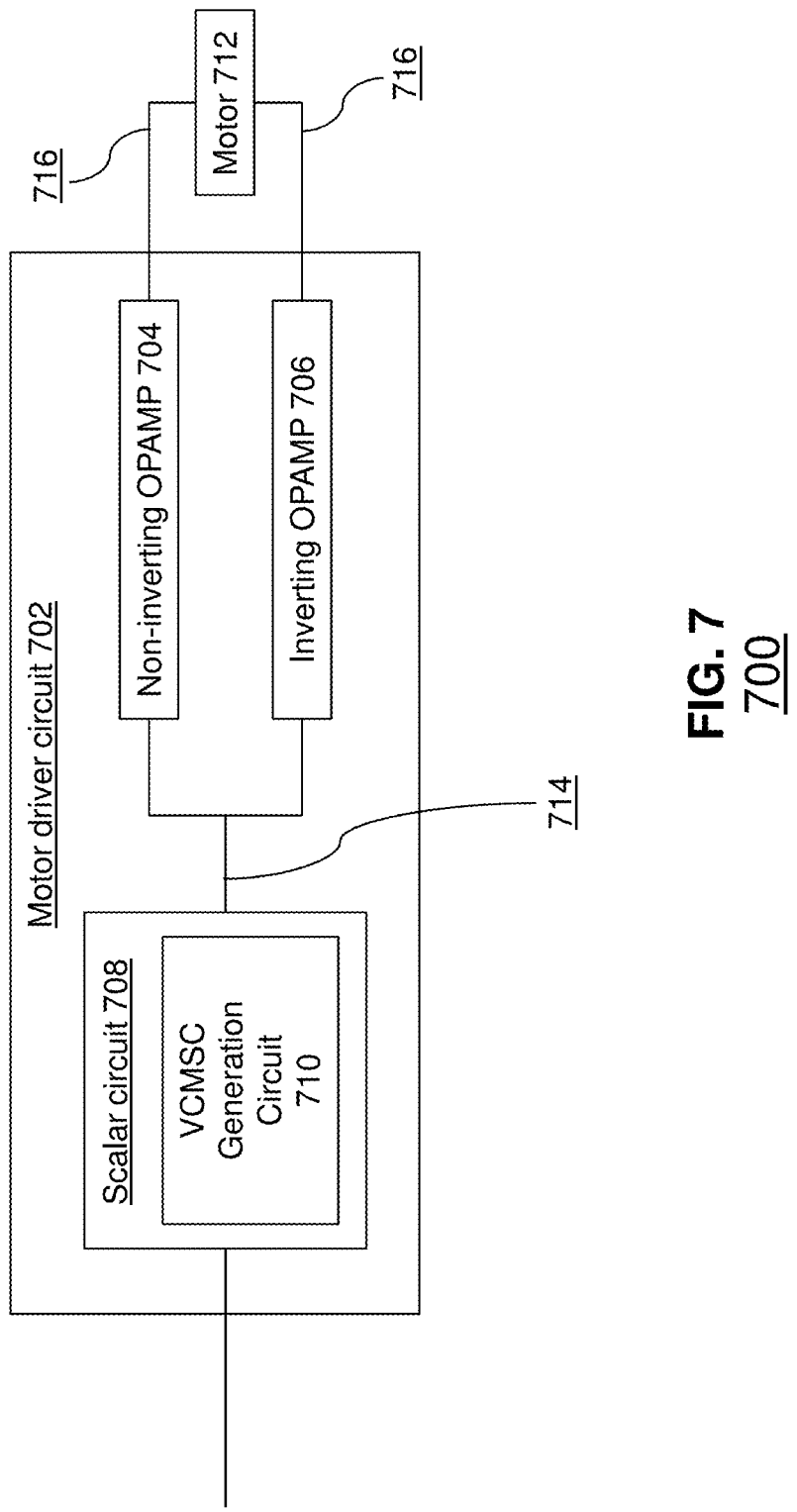
FIG. 7 illustrates a block diagram of a motor driver circuit for a MEMS micro mirror device in accordance with a present embodiment.

A motor driver circuit for a MEMS micro-mirror device in accordance with an embodiment of the present invention is illustrated in the block diagram 700 of FIG. 7. The motor driver circuit 702 comprises a non-inverting buffer circuit 704, an inverting buffer circuit 706, and a scalar circuit 708. The scalar circuit 708 comprises a VCMSC generation circuit 710. The non-inverting buffer circuit 704, the inverting buffer circuit 706, and the scalar circuit 708 are configured, together with the VCMSC generation circuit 710, to provide a common mode voltage 716 to a motor 712 in response to a VCMSC voltage (not shown) generated by the VCMSC generation circuit 710. The VCMSC voltage is generated by the VCMSC generation circuit 710 in response to a control supply voltage (not shown) and a driver supply voltage (not shown) provided to the VCMSC generation circuit 710. The VCMSC generation circuit is configured to track the common mode voltage automatically, independent of variations in supply voltage to the scalar circuit and/or variations to the scalar gain of the scalar circuit.

Figure 8:
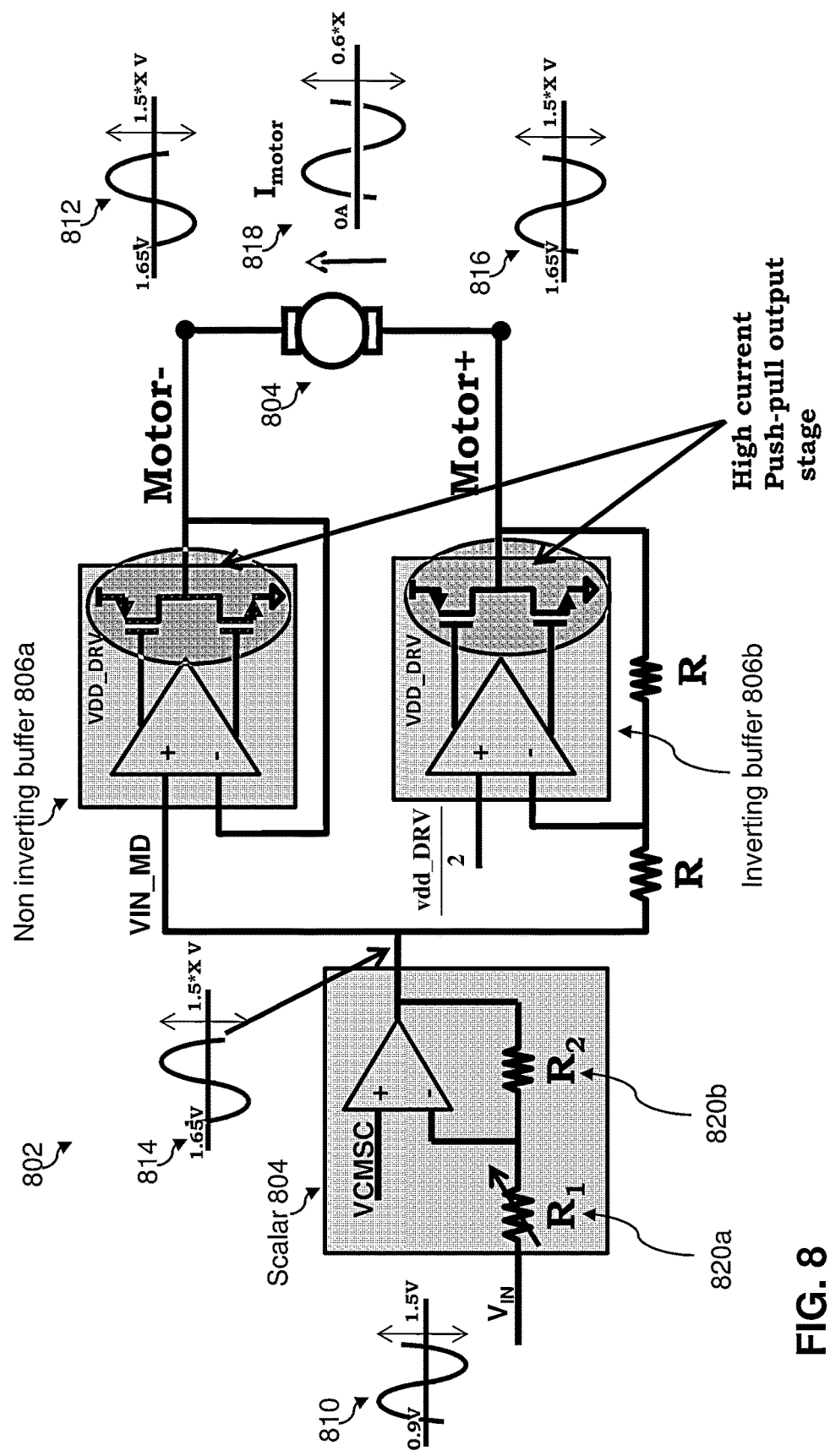
FIG. 8 illustrates a block diagram of a motor driver circuit in the present embodiment.

FIG. 8. illustrates a block diagram 800 of the motor driver circuit architecture. The motor driver circuit 802 uses two class-AB biased buffers 806a, 806b having push-pull output stages. The motor 804 is connected across the outputs of a non-inverting buffer 806a and an inverting buffer 806b. The buffers 806a, 806b are designed in the higher supply voltage available to provide higher currents to the motor. As the system is powered by a battery, typical voltages available are around 3.3 Volts (V). Sizes of the transistors of push-pull stages are chosen fairly large to minimize the drain-source voltage drop.

Remaining circuits in the driving ASIC are designed in lower voltage domain of 1.8V. Control voltage ($V_{IN}$) for the driver circuit varies from 0.15V to 1.65V. As the output buffers 806a, 806b of the driver circuit 802 operate in 3.3V domain a circuit is required which translates control voltages to the 3.3V domain. A variable gain buffer, here called scalar circuit 808, is used for amplifying signals from 1.8V domain to 3.3V domain.

FIG. 8. further illustrates the corresponding signal flow for the driver circuit 802. In an embodiment, a sinusoid input 810 with DC offset of 0.9V and amplitude of 1.5V is applied to the driver circuit 802. The input signal 810 is amplified by the scalar circuit 804 and applied to inverting and non-inverting buffers 806b, 806a. Output of the non-inverting buffer 812 is the same as the scalar output 814 while the output of the inverting buffer 816 is an inverted replica of the scalar output 814. The voltage across the motor 804 is the difference of the voltage outputs of the two buffers 812, 816. Current in the motor 818 is determined by this differential voltage. Both the motor current 818 and the control voltage (not sown) have a linear response. The gain of the scalar 804 is controlled by the ratio of resistors R1 and R2 820a, 820b.

In analogue systems working with uni-polar power supply (0V as ground and VDD as power), common mode input (VCM) acts as the reference. All the signals are processed with respect to the common reference (VCM). This means for an input of $V_{IN}$, $V_{IN}$-VCM will be subjected to any gain or filtering whatsoever and the output will also be around VCM. In this example, the gain of a non-inverting buffer is +1 and that of an inverting buffer is −1. As shown FIG. 8, if a sin wave is applied at VIN 814 having DC of 1.65V (=VCM), non-inverting buffer 806a will provide the same at the output 812. Whereas, the inverting buffer 806b will invert the sine wave producing output 816, while maintaining the DC.

In an embodiment, the non-inverting buffer 806a and the inverting buffer 806b may be configured as gain blocks to control the gain in the circuit. For example, instead of gain of +1 and −1, one could use a gain of +1.5 and −1.5. This advantageously allows for the non-inverting buffer 806a and the inverting buffer 806b to modify the gain together with, or independent of, the scalar circuit.

Supply Tracked Common-Mode (VCMSC) Generation for Scalar Circuit

Figure 9:
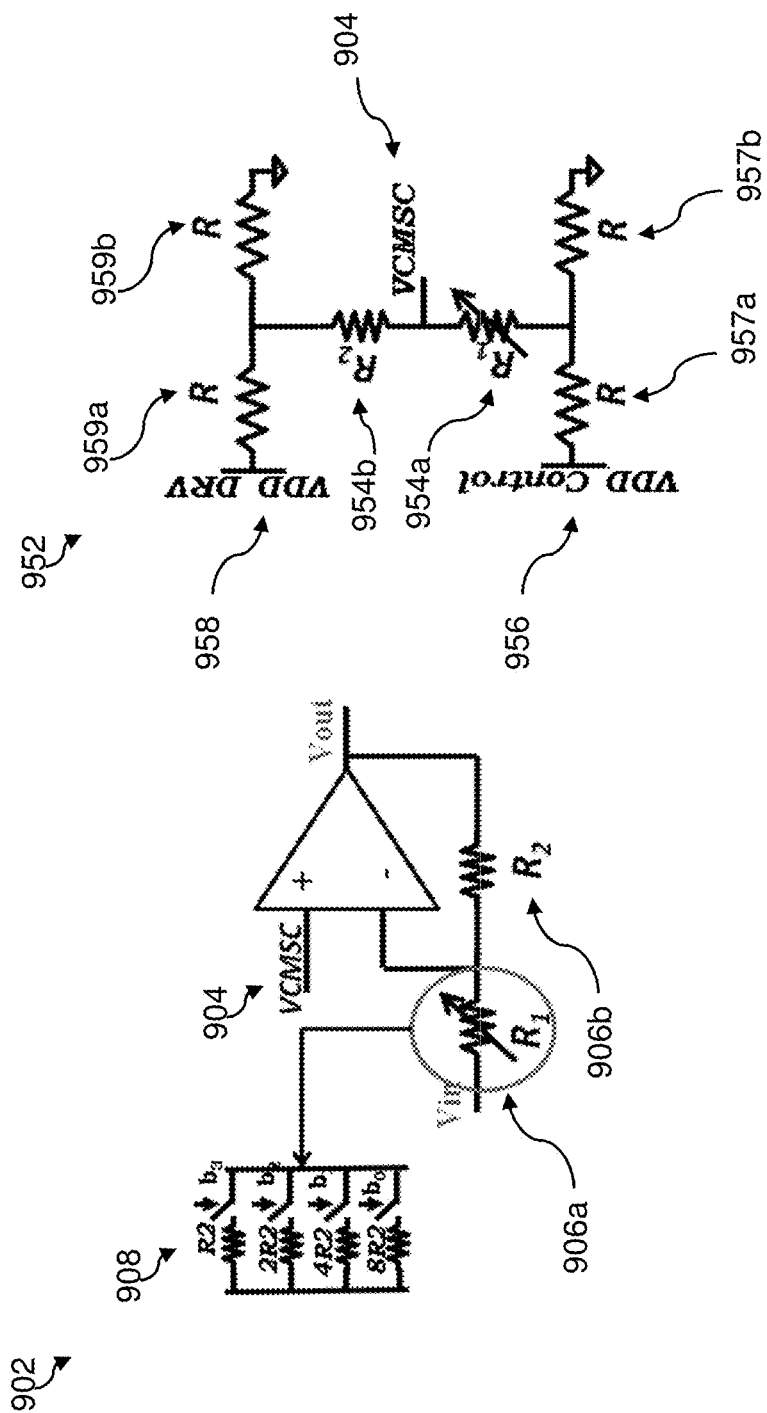
FIG. 9, comprising

FIG. 9, comprising FIG. 9A and FIG. 9B, illustrates VCMSC generation in accordance with the present embodiment, wherein FIG. 9A illustrates circuit architecture 900 of the scalar circuit 902 and FIG. 9B illustrates circuit architecture 950 of the VCMSC generation circuit 952. To achieve higher current drivability the motor driver circuit is powered directly from the battery voltage. However, battery voltage is unregulated and can vary over its life time. It is required to have a linear DC I-V characteristics with programmable slope having rest position of the mirror (zero motor current) when the input to the driver is at its common mode of 0.9 V (VDD_Control/2), where VDD_Control is the supply voltage of the preceding controller block (not shown). It is achieved in the scalar circuit 902 by generating a suitable VCMSC voltage 904 in the VCMSC generation circuit 952. Bias voltage, or VCMSC, at the non-inverting input of the Operational Amplifier (OPAMP) buffer circuit is required to be generated such that the output common-mode voltage of the scalar output is always VDD_DRV/2, where VDD_DRV is the supply voltage of the drive circuit.

In FIG. 9B, the VCMSC generation circuit comprises a first resistor bridge 957a 957b, a second resistor bridge 959a 959b, and a variable resistor bridge 954a 954b. The binary weighted parallel resistors are configured to be controlled by a digital code. The first resistor bridge 957a 957b is configured to modify the control supply voltage 956, the second resistor bridge 959a 959b is configured to modify the driver supply voltage 958, and the variable resistor bridge 954a 954b is configured to modify any one or a combination of the control supply voltage 956 or the driver supply voltage 958 to generate the VCMSC voltage 904.

In an embodiment, the scalar circuit comprises a resistor $R_1$ 906a is bank of five parallel resistors 908 which are binary weighted. The binary weighted parallel resistors are configured to be controlled by a digital code. The resistors of the resistor bank 908 can be connected or disconnected using the digitally controlled transmission gate switches. This allows the scalar gain to be controlled by a 5-bit digital code. Changing the code, changes value of $R_1$ 906a and consequently the gain of the scalar circuit 902. Similarly, as Resistor $R_1$ 954a of the VCMSC generation circuit 952 also comprises a bank of five parallel resistors which are binary weighted (not shown).

The resistor dividers in the VCMSC generation circuit represented as R1 954a and R2 954a are not physically same as resistors R1 906a and R2 906b in the scalar circuit 902 but may have same values. Alternatively, they may have different values, but maintaining the same ratio between R1 and R2. For example, assuming the scalar circuit has R1=10K, R2=20K, VCMSC generation block can also have R1=M*10K and R2=M*20K, which maintains the gain ratio. Alternatively, the VCMSC generation circuit 952 may also comprise resistors 954a, 954b with values R1=10K and R2=20K, being equal to the resistor values of the scalar circuit.

The equation for generating the VCMSC voltage 904 is provided in equation (1) below. VCMSC voltage 904 is derived using the virtual ground concept at the inverting input buffer circuit. VDD_Control and VDD_DRV are the supply voltage for the control circuit 956 and supply voltage for the driver 958 respectively. Equation (1) shows that required VCMSC 904 depends upon the gain provided by the scalar, as well as supply voltages 956, 958. Equation (1) can be realized by a resistor divider circuit 925 for generating VCMSC (VCMSC generation circuit), as shown in FIG. 9B. The VCMSC generation circuit 952 generates VCMSC 904 such that the input signal is amplified from lower supply domain to higher supply domain independent of supply variations and for all the programmable gains.

$$\frac{VCMSC - \frac{VDD\_Control}{2}}{R_1} + \frac{VCMSC - \frac{VDD\_DRV}{2}}{R_2} = 0 \quad (1)$$

Measurement Results

Figure 10:
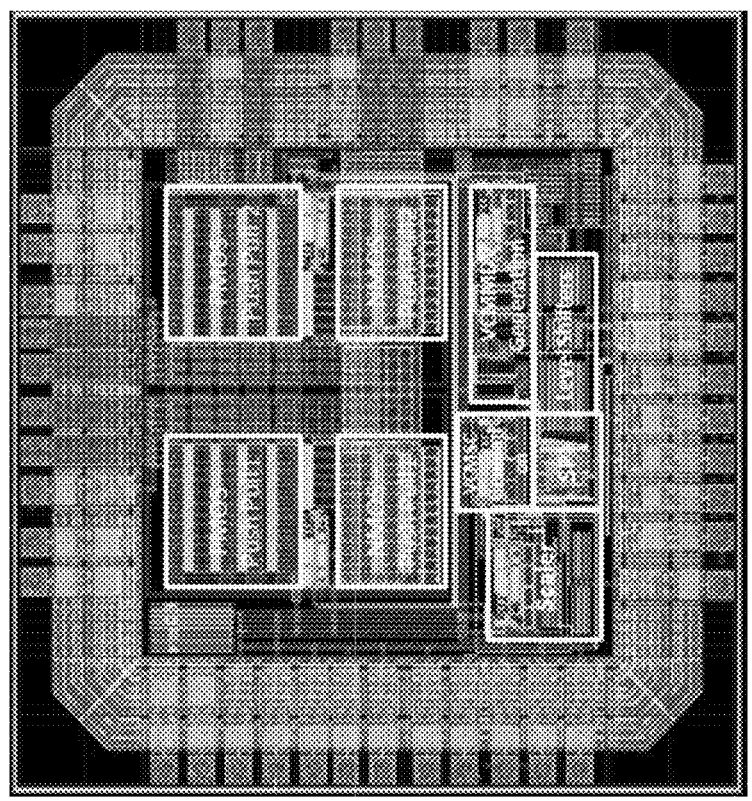
FIG. 10 illustrates a layout of the motor driver chip for a MEMS micro-mirror device in the present embodiment.

FIG. 10 illustrates a layout 1000 of the motor driver chip 1002 for a MEMS micro-mirror device in the present embodiment. The motor driver chip 1002 in the present embodiment is fabricated in 0.18-um CMOS occupies 1.8× 1.8 mm$^2$. The area of the core circuit without the pads is 1.6×1.6 mm$^2$. 20 percent area of the chip is occupied by the transistors of push-pull output stage of the buffers. The bottom part of the chip contains the scalar circuit, the VCMSC generation and the bias circuit components. The whole chip current is 16 mA under no load condition. Each high current driving buffer consumes 7 mA. The rest of the 2 mA is consumed by the scalar, the VCMSC generation circuit and the biasing circuit.

Figure 11:
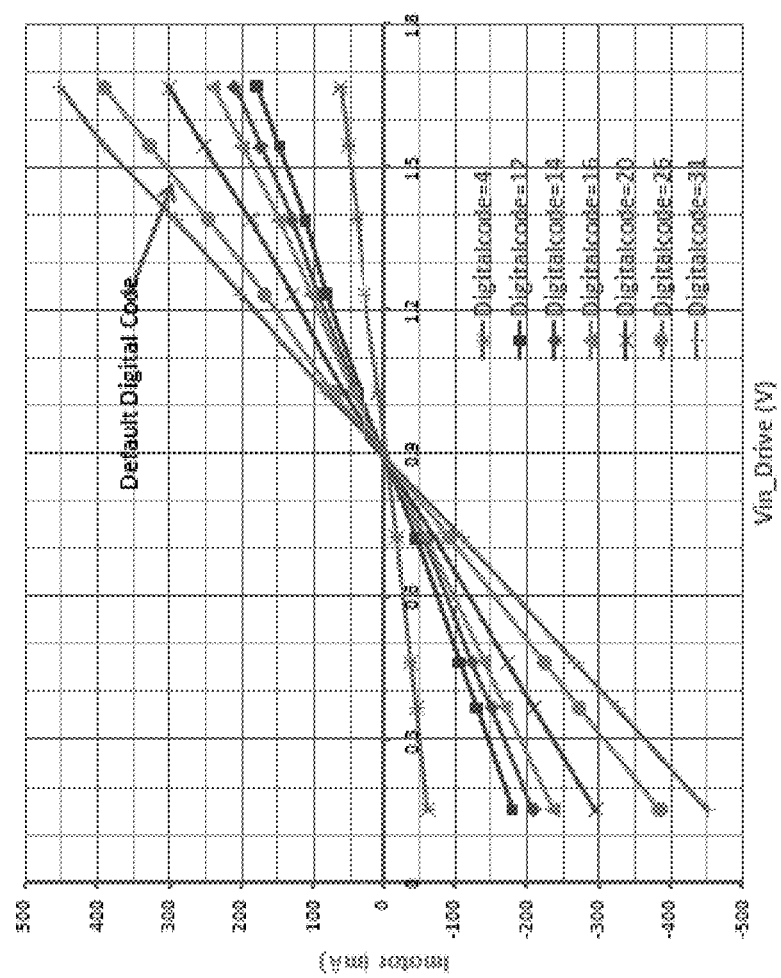
FIG. 11 illustrates a plot of the measured Current-Voltage (I-V) characteristics of the MEMS micro-mirror driver in the present embodiment and its variation dependency on the digital code.

FIG. 11 illustrates a plot 1100 of the measured I-V characteristics of the MEMS micro-mirror driver in the present embodiment and its variation dependency on the digital code. When measured with the MEMS as load and the scalar gain at its default value (Gain=3.3/1.8) the driver is able to supply current up to 400 mA in both negative and positive directions. For the lowest scalar gain, maximum current to the motor is 15 mA, while for maximum gain it is 450 mA in any direction. The peak current can be increased in steps of 15 mA. DC voltage varying from 0.15V to 1.65V is applied to the driver circuit. The current in the motor is zero at input voltage of 0.9V and it changes its direction at this point.

Figure 12:
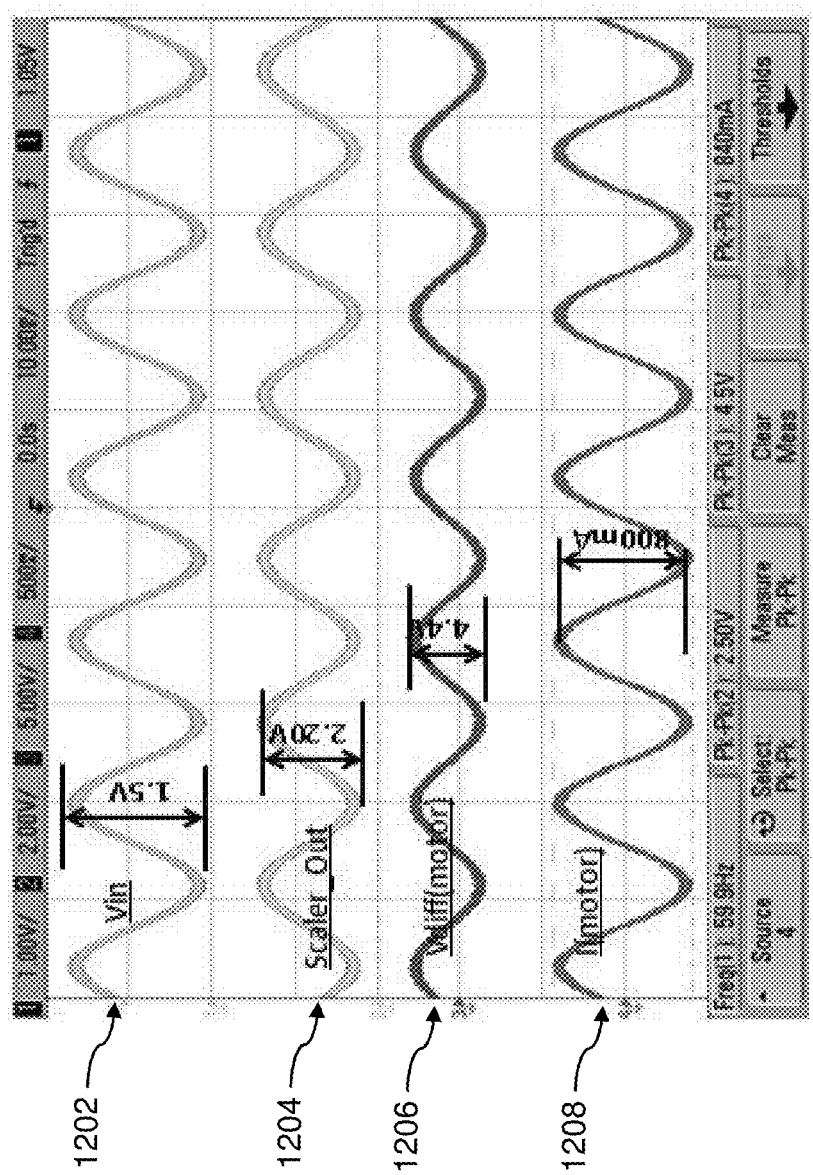
FIG. 12 illustrates a plot of a measured wave form of the MEMS micro-mirror device in the present embodiment when a sinusoid control signal of 60 Hertz (Hz) is applied.

FIG. 12 illustrates a plot 1200 of a measured wave form of the proposed MEMS micro-mirror device when a sinusoid signal of 60 Hertz (Hz) is applied. The vertical scanning rate of the mirror is 60 Hz. A sinusoid voltage 1202 with DC value of 0.9V, amplitude of 1.5V and frequency of 60 Hz is applied to the motor driver at the default digital code and MEMS as load. Further, the plot 1200 shows the measured oscilloscope waveform for input voltage 1202, scalar output voltage 1204, differential motor output voltage 1206, and motor current 1208. Motor current 1208 and differential motor output voltage 1206 have DC value equal to zero with peak to peak amplitude of 800 mA and 4.5V respectively. The scalar output voltage 1204 has a DC value equal to 1.65V and amplitude of 2.25V.

Figure 13:
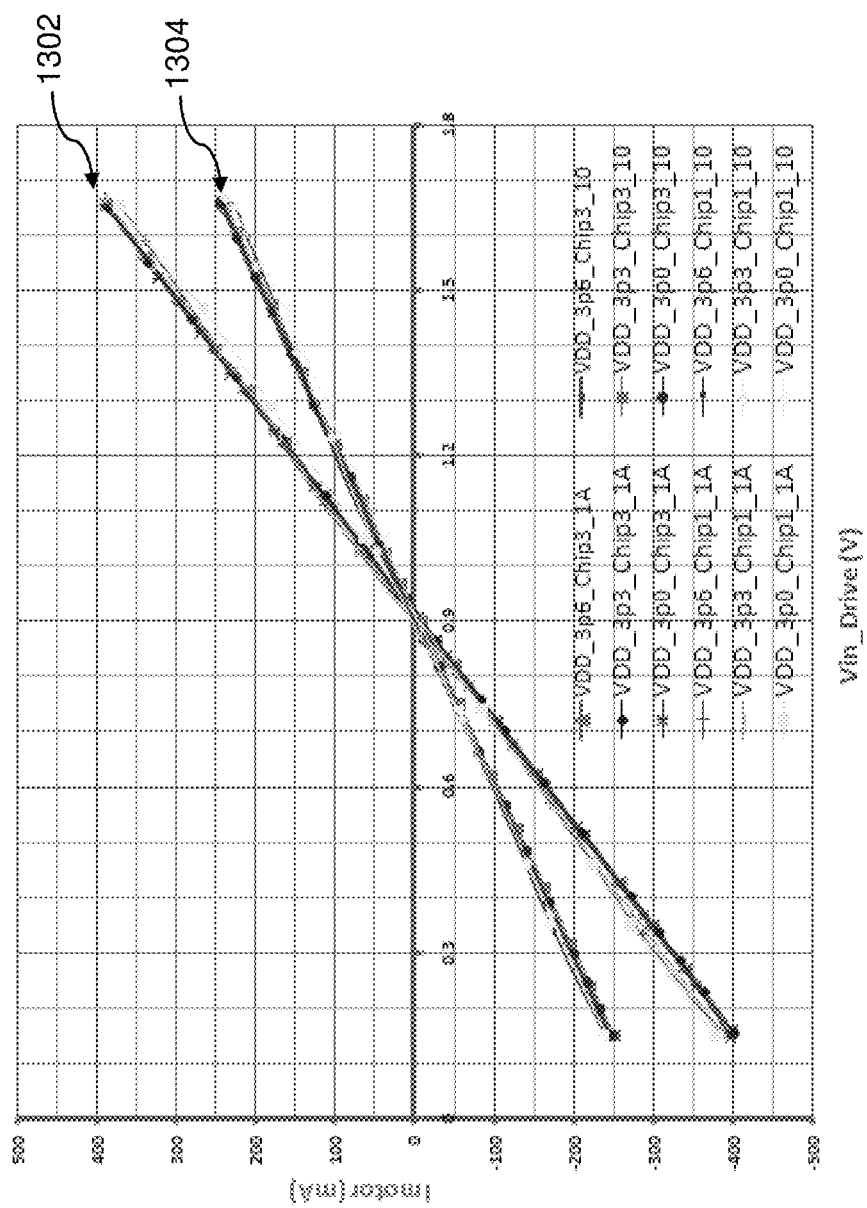
FIG. 13 illustrates a plot of measured I-V characteristics of two MEMS micro-mirror drivers in the present embodiment.

FIG. 13 illustrates a plot 1300 of measured I-V characteristics of two MEMS micro-mirror drivers. Two MEMS micro-mirror drivers were measured, each operating at a supply voltage VDD_DRV of 3.0V, 3.3V or 3.6V. Two different digital codes of 10 and 1 A were used. I-V characteristics were measured for all these conditions, and plotted in FIG. 13. It can be observed from the plots 1302, 1304 corresponding to different digital codes, that I-V characteristics for different VDD_DRV results overlap each other for both the devices. It is observed from the plots that VCMSC is automatically tracked with supply voltage variations and no offset current is observed at the common-mode of input signal. This advantageously allows increased performance by providing a well-defined rest position of the motor without any shift resulting from variation in the supply and changes to the gain. This allows for symmetry in the motor I-V characteristics. Further, this advantageously allows the motor to work for different power supplies. The motor of the present embodiment is also advantageously able to be driven by a stepped waveform, yet retaining image projection quality due to the linear I-V characteristics of the supply to the motor.

Figure 14:
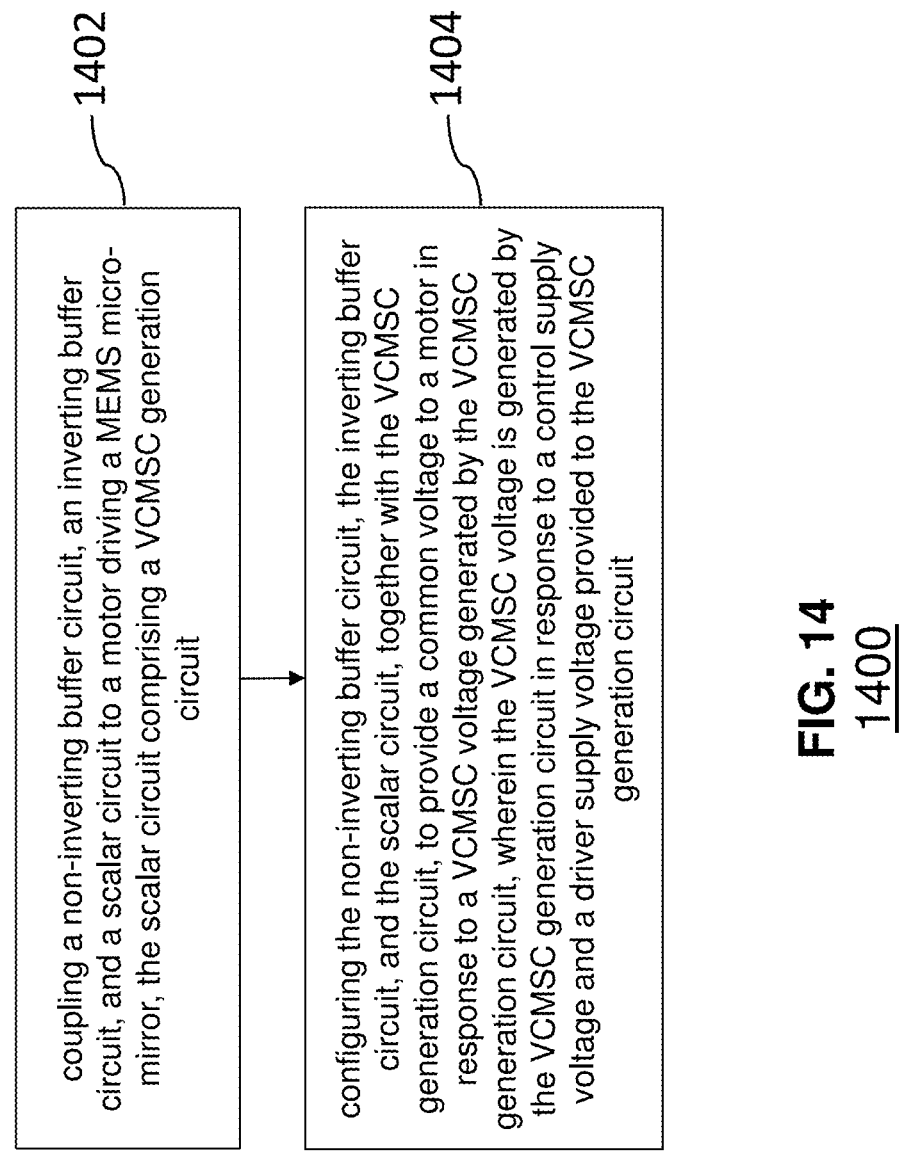
FIG. 14 illustrates a broad method of controlling a MEMS micro-mirror in accordance with a present embodiment.

FIG. 14 illustrates a broad method 1400 of controlling a MEMS micro-mirror. In step 1402, a non-inverting buffer circuit, an inverting buffer circuit, and a scalar circuit to a motor driving a MEMS micro-mirror are electrically coupled. The scalar circuit comprising a VCMSC generation circuit. In step 1404, the non-inverting buffer circuit, the inverting buffer circuit, and the scalar circuit are configured, together with the VCMSC generation circuit, to provide a common voltage to a motor in response to a VCMSC voltage generated by the VCMSC generation circuit, wherein the VCMSC voltage is generated by the VCMSC generation circuit in response to a control supply voltage and a driver supply voltage provided to the VCMSC generation circuit.

In a further embodiment, the method further comprises, after the configuring step, positioning the motor in a rest position in response to the common mode voltage generated by the VCMSC generation circuit. The step of configuring further comprises tracking the common mode voltage via the VCMSC generation circuit automatically. This tracking is independent of variation in the supply voltage and/or the scalar gain of the scalar circuit. This motor is also advantageously able to be driven by stepped saw tooth waveform non-resonantly. This allows smooth operation of the motor without noise around zero crossing.

The motor driver circuit in accordance with embodiments described above, and the method of controlling a MEMS micro-mirror, may be implemented in a MEMS device. In an embodiment, the MEMS device a MEMS micro-mirror. A motor is coupled to a MEMS micro-mirror and the motor driver circuit in accordance with the embodiments disclosed above. The motor driver circuit comprises a non-inverting buffer circuit, an inverting buffer circuit, and a scalar circuit. The scalar circuit comprises a VCMSC generation circuit. The non-inverting buffer circuit, the inverting buffer circuit, and the scalar circuit are configured, together with the VCMSC generation circuit, to provide a common mode voltage to a motor in response to a VCMSC voltage generated by the VCMSC generation circuit. The VCMSC voltage is generated by the VCMSC generation circuit in response to a control supply voltage and a driver supply voltage provided to the VCMSC generation circuit.

Thus, in accordance with the present embodiment, a novel, advantageous means for actuating MEMS scanning mirrors has been presented, which overcomes the drawback of prior art. Embodiments of the invention are usable for modern and future motor control systems, and can be extended for other motor applications.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

What is claimed is:

1. A motor driver circuit for a Micro-electro-mechanical systems (MEMS) micro-mirror device, the motor driver circuit comprising:
    a non-inverting buffer circuit;
    an inverting buffer circuit; and
    a scalar circuit, the scalar circuit comprising a Supply Tracked Common Mode Voltage (VCMSC) generation circuit,
    wherein the VCMSC voltage is generated by the VCMSC generation circuit in response to a control supply voltage and a driver supply voltage provided to the VCMSC generation circuit, and
    wherein the non-inverting buffer circuit, the inverting buffer circuit, and the scalar circuit are configured, together with the VCMSC generation circuit, to provide a common mode voltage to a motor in response to a VCMSC voltage generated by the VCMSC generation circuit, the VCMSC generation circuit automatically tracking the common mode voltage independent of at least one of variations in supply voltage to the scalar circuit and variations to the scalar gain of the scalar circuit to provide the common mode voltage having linear direct current (DC) current-voltage characteristics to the motor for driving the motor.

2. The motor driver circuit in accordance with claim 1, wherein the linear DC current-voltage characteristics comprise a programmable DC current-voltage slope, and wherein the VCMSC generation circuit is further configured to provide the common mode voltage having the programmable slope to the motor, the motor being in a rest position in response to the control supply voltage being at its common mode.

3. A motor driver circuit for a Micro-electro-mechanical systems (MEMS) micro-mirror device, the motor driver circuit comprising:
    a non-inverting buffer circuit;
    an inverting buffer circuit; and
    a scalar circuit, the scalar circuit comprising a Supply Tracked Common Mode Voltage (VCMSC) generation circuit,
    wherein the non-inverting buffer circuit, the inverting buffer circuit, and the scalar circuit are configured, together with the VCMSC generation circuit, to provide a common mode voltage to a motor in response to a VCMSC voltage generated by the VCMSC generation circuit,
    wherein the VCMSC voltage is generated by the VCMSC generation circuit in response to a control supply voltage and a driver supply voltage provided to the VCMSC generation circuit, and
    wherein the VCMSC generation circuit comprises a first resistor bridge, a second resistor bridge, and a variable resistor bridge, wherein the first resistor bridge is coupled to the control supply voltage, the second resistor bridge is coupled to the driver supply voltage, and the variable resistor bridge is configured with the first and second resistor bridges to change the VCMSC voltage in response to a change in at least one of the control supply voltage and the driver supply voltage.

4. The motor driver circuit in accordance with claim 3, wherein the variable resistor bridge comprises binary weighted parallel resistors.

5. The motor driver circuit in accordance with claim 4, wherein the binary weighted parallel resistors are configured to be controlled by a digital code.

6. A MEMS device, comprising:
    a MEMS micro-mirror;
    a motor coupled to a MEMS micro-mirror; and
    a motor driver circuit, the motor driver circuit comprising:
        a non-inverting buffer circuit;
        an inverting buffer circuit; and
        a scalar circuit, the scalar circuit comprising a VCMSC generation circuit,
        wherein the VCMSC voltage is generated by the VCMSC generation circuit in response to a control supply voltage and a driver supply voltage provided to the VCMSC generation circuit, and
        wherein the non-inverting buffer circuit, the inverting buffer circuit, and the scalar circuit are configured, together with the VCMSC generation circuit, to provide a common mode voltage to the motor in response to a VCMSC voltage generated by the VCMSC generation circuit, the VCMSC generation circuit automatically tracking the common mode voltage independent of at least one of variations in supply voltage to the scalar circuit and variations to the scalar gain of the scalar circuit to provide the common mode voltage having linear direct current (DC) current-voltage characteristics to the motor for driving the motor.

7. The MEMS device in accordance with claim 6, wherein the linear DC current-voltage characteristics comprise a programmable DC current-voltage slope, and wherein the VCMSC generation circuit is further configured to provide the common mode voltage having the programmable slope to the motor, the common voltage providing zero motor current to position the motor in a rest position in response to the control supply voltage being at its common mode.

8. A MEMS device, comprising:
a MEMS micro-mirror;
a motor coupled to a MEMS micro-mirror; and
a motor driver circuit, the motor driver circuit comprising:
   a non-inverting buffer circuit;
   an inverting buffer circuit; and
   a scalar circuit, the scalar circuit comprising a VCMSC generation circuit,
   wherein the non-inverting buffer circuit, the inverting buffer circuit, and the scalar circuit are configured, together with the VCMSC generation circuit, to provide a common mode voltage to a motor in response to a VCMSC voltage generated by the VCMSC generation circuit,
   wherein the VCMSC voltage is generated by the VCMSC generation circuit in response to a control supply voltage and a driver supply voltage provided to the VCMSC generation circuit, and
   wherein the VCMSC generation circuit comprises a first resistor bridge, a second resistor bridge, and a variable resistor bridge, wherein the first resistor bridge is coupled to the control supply voltage, the second resistor bridge is coupled to the driver supply voltage, and the variable resistor bridge is configured with the first and second resistor bridges to change the VCMSC voltage in response to a change in at least one of the control supply voltage and the driver supply voltage.

9. The MEMS device in accordance with claim 8, wherein the variable resistor bridge comprises binary weighted parallel resistors.

10. The MEMS device in accordance with claim 9, wherein the binary weighted parallel resistors are configured to be controlled by a digital code.

* * * * *